(12) United States Patent
Kako

(10) Patent No.: US 12,494,324 B2
(45) Date of Patent: Dec. 9, 2025

(54) CAPACITOR AND METHOD FOR MANUFACTURING SAME

(71) Applicant: Rubycon Corporation, Nagano (JP)

(72) Inventor: Tomonao Kako, Nagano (JP)

(73) Assignee: Rubycon Corporation, Nagano (JP)

( * ) Notice: Subject to any disclaimer, the term of this patent is extended or adjusted under 35 U.S.C. 154(b) by 80 days.

(21) Appl. No.: 18/682,101

(22) PCT Filed: Aug. 2, 2022

(86) PCT No.: PCT/JP2022/029625
§ 371 (c)(1),
(2) Date: Feb. 7, 2024

(87) PCT Pub. No.: WO2023/017756
PCT Pub. Date: Feb. 16, 2023

(65) Prior Publication Data
US 2024/0347278 A1    Oct. 17, 2024

(30) Foreign Application Priority Data
Aug. 10, 2021    (JP) .................................. 2021-130498

(51) Int. Cl.
*H01G 4/33*    (2006.01)
*H01G 4/008*    (2006.01)
(Continued)

(52) U.S. Cl.
CPC ............... *H01G 4/33* (2013.01); *H01G 4/008* (2013.01); *H01G 4/145* (2013.01); *H01G 4/2325* (2013.01)

(58) Field of Classification Search
CPC ...... H01G 4/005; H01G 4/2325; H01G 4/008; H01G 4/145; H01G 4/33
See application file for complete search history.

(56) References Cited

U.S. PATENT DOCUMENTS

| 5,757,607 A | * | 5/1998 | Folli | ..................... H01G 4/012 361/290 |
| 2001/0020754 A1 | | 9/2001 | Honda et al. | |

(Continued)

FOREIGN PATENT DOCUMENTS

| JP | 596519 A | 1/1984 |
| JP | H04311017 A | * 11/1992 |

(Continued)

OTHER PUBLICATIONS

International Search Report and Written Opinion for PCT/JP2022/029625 mailed Nov. 1, 2022, 8 pages.
(Continued)

*Primary Examiner* — David M Sinclair
(74) *Attorney, Agent, or Firm* — Blank Rome LLP

(57) ABSTRACT

A capacitor (1) includes a main body (10) in which dielectric layers (13) and electrode layers (11) are laminated, and an external electrode (20) connected to at least a part of the main body by metallikon. Each dielectric layer has a thickness Dt at a connection boundary (18) where the main body is connected to the external electrode, each electrode layer has a thickness Et at the connection boundary, and a ratio between the thickness Dt and the thickness Et is at least a first value DEmin. The first value DEmin may satisfy the following conditions with respect to a minimum set value Dt1 of the thickness Dt $$DEmin \geq a \times Dt1 + b$$
$$0.1\ \mu m \leq Dt1 \leq Dt \leq 1.5\ \mu m$$

where a and b are coefficients.

14 Claims, 12 Drawing Sheets

(51) Int. Cl.
*H01G 4/14* (2006.01)
*H01G 4/232* (2006.01)

(56) References Cited

U.S. PATENT DOCUMENTS

| | | |
|---|---|---|
| 2013/0050895 A1 | 2/2013 | Tezuka et al. |
| 2015/0138691 A1 | 5/2015 | Takeoka et al. |
| 2016/0284472 A1 | 9/2016 | Malizis |
| 2018/0090277 A1 | 3/2018 | Kikuchi |
| 2020/0335283 A1 | 10/2020 | Ozasa et al. |
| 2023/0170151 A1 | 6/2023 | Kako et al. |

FOREIGN PATENT DOCUMENTS

| | | | |
|---|---|---|---|
| JP | 11186097 A | | 7/1999 |
| JP | 2002367854 A | * | 12/2002 |
| JP | 2003257783 A | | 9/2003 |
| JP | 2008294431 A | * | 12/2008 |
| JP | 201186802 A | | 4/2011 |
| JP | 2013219094 A | * | 10/2013 |
| JP | 2013247207 A | | 12/2013 |
| JP | 2020-519003 A | | 6/2020 |
| JP | 2021019133 A | | 2/2021 |
| WO | 2013179612 A1 | | 12/2013 |
| WO | 2016152800 A1 | | 9/2016 |
| WO | 2019150839 A1 | | 8/2019 |

OTHER PUBLICATIONS

International Search Report for PCT/JP2021/029470, mailed Nov. 2, 2021, 2 pages.
International Preliminary Report on Patentability received for PCT Patent Application No. PCT/JP2022/029625 mailed on Feb. 22, 2024, 9 pages. (with English Translation).

* cited by examiner (a)

| THICKNESS OF DIELECTRIC LAYER Dt [μm] | <INTERNAL ELECTRODE PART: Aℓ, HEAVY EDGE PORTION: Aℓ>   THICKNESS OF ELECTRODE LAYER AT HEAVY EDGE PORTION (Et) [μm] | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | 0.005 | 0.010 | 0.015 | 0.020 | 0.025 | 0.030 | 0.035 | 0.040 | 0.045 | 0.050 | 0.055 | 0.060 | 0.065 | 0.070 | 0.075 | 0.080 | 0.085 | 0.090 | 0.095 | 0.100 | 0.105 | 0.110 | 0.115 | 0.120 | 0.125 | 0.130 | 0.135 | 0.140 | 0.145 | 0.150 | 0.155 | 0.160 | 0.165 |
| 1.5 | × | △ | ◎ | ◎ | | | | | | | | | | | | | | | | | | | | | | | | ◎ | ◎ | ○ | ○ | △ | × |
| 1.2 | × | △ | ◎ | ◎ | | | | | | | | | | | | | | | | | | | | | | ◎ | ◎ | △ | ○ | △ | × | | |
| 0.8 | × | △ | ◎ | ◎ | | | | | | | | | | | | | | | | | | | ◎ | ○ | △ | × | | | | | | | |
| 0.6 | × | △ | ◎ | ◎ | | | | | | | | | | | | | | | | ◎ | ○ | × | | | | | | | | | | | |
| 0.4 | × | △ | ◎ | ◎ | ◎ | | | | | | | | | | | ◎ | ○ | △ | | | | | | | | | | | | | | | |
| 0.3 | × | △ | ◎ | ◎ | ◎ | | | | | | | ◎ | ○ | △ | × | | | | | | | | | | | | | | | | | | |
| 0.2 | × | △ | ◎ | ◎ | ◎ | ◎ | | △ | × | | ◎ | ◎ | | | | | | | | | | | | | | | | | | | | | |
| 0.1 | × | △ | ◎ | ◎ | ○ | △ | × | | | | | | | | | | | | | | | | | | | | | | | | | | |

Fig. 5

| CAPACITANCE (100% DESIGN VALUE) | ◎ | ○ | △ | × |
|---|---|---|---|---|
| | ≥95% | ≥95% | ≥90% | <90% |
| tan δ (1kHz) | ≤0.9% | ≤0.95% | ≤1.0% | >1.0% |

Fig. 6

| THICKNESS OF DIELECTRIC LAYER Dt | THICKNESS OF ELECTRODE LAYER – UPPER LIMIT Etmax1 (◎○△) | THICKNESS OF ELECTRODE LAYER – UPPER LIMIT Etmax2 (◎○) | THICKNESS OF ELECTRODE LAYER – LOWER LIMIT Etmin1 (◎○△) | THICKNESS OF ELECTRODE LAYER – LOWER LIMIT Etmin2 (◎○) | DE1 (Dt/Etmax1) | DE2 (Dt/Etmax2) | ED1 (Etmax1/Dt) | ED2 (Etmax2/Dt) |
|---|---|---|---|---|---|---|---|---|
| [μm] | [μm] | [μm] | [μm] | [μm] | | | | |
| 1.5 | 0.160 | 0.155 | 0.010 | 0.015 | 9.4 | 9.7 | 0.11 | 0.10 |
| 1.2 | 0.155 | 0.140 | 0.010 | 0.015 | 7.7 | 8.6 | 0.13 | 0.12 |
| 0.8 | 0.140 | 0.125 | 0.010 | 0.015 | 5.7 | 6.4 | 0.18 | 0.16 |
| 0.6 | 0.125 | 0.115 | 0.010 | 0.015 | 4.8 | 5.2 | 0.21 | 0.19 |
| 0.4 | 0.105 | 0.095 | 0.010 | 0.015 | 3.8 | 4.2 | 0.26 | 0.24 |
| 0.3 | 0.090 | 0.080 | 0.010 | 0.015 | 3.3 | 3.8 | 0.30 | 0.27 |
| 0.2 | 0.075 | 0.065 | 0.010 | 0.015 | 2.7 | 3.1 | 0.38 | 0.33 |
| 0.1 | 0.045 | 0.035 | 0.010 | 0.015 | 2.2 | 2.9 | 0.45 | 0.35 |

| THICKNESS OF DIELECTRIC LAYER Dt | THICKNESS OF ELECTRODE LAYER - UPPER LIMIT Etmax1 (◎○△) | THICKNESS OF ELECTRODE LAYER - UPPER LIMIT Etmax2 (◎○) | THICKNESS OF ELECTRODE LAYER - LOWER LIMIT Etmin1 (◎○△) | THICKNESS OF ELECTRODE LAYER - LOWER LIMIT Etmin2 (◎○) | DE1 (Dt/Etmax1) | DE2 (Dt/Etmax2) | ED1 (Etmax1/Dt) | ED2 (Etmax2/Dt) |
|---|---|---|---|---|---|---|---|---|
| [μm] | [μm] | [μm] | [μm] | [μm] | | | | |
| 1.5 | 0.160 | 0.150 | 0.010 | 0.015 | 9.4 | 10.0 | 0.12 | 0.10 |
| 1.2 | 0.155 | 0.140 | 0.010 | 0.015 | 7.7 | 8.6 | 0.13 | 0.12 |
| 0.8 | 0.140 | 0.125 | 0.010 | 0.015 | 5.7 | 6.4 | 0.18 | 0.16 |
| 0.6 | 0.125 | 0.110 | 0.010 | 0.015 | 4.8 | 5.5 | 0.21 | 0.18 |
| 0.4 | 0.110 | 0.090 | 0.010 | 0.015 | 3.6 | 4.4 | 0.28 | 0.23 |
| 0.3 | 0.090 | 0.075 | 0.010 | 0.015 | 3.3 | 4.0 | 0.30 | 0.25 |
| 0.2 | 0.070 | 0.060 | 0.010 | 0.015 | 2.9 | 3.3 | 0.35 | 0.30 |
| 0.1 | 0.040 | 0.035 | 0.010 | 0.015 | 2.5 | 2.9 | 0.40 | 0.35 |

| THICKNESS OF DIELECTRIC LAYER Dt [μm] | THICKNESS OF ELECTRODE LAYER - UPPER LIMIT Etmax1 (◎○△) [μm] | THICKNESS OF ELECTRODE LAYER - UPPER LIMIT Etmax2 (◎○) [μm] | THICKNESS OF ELECTRODE LAYER - LOWER LIMIT Etmin1 (◎○△) [μm] | THICKNESS OF ELECTRODE LAYER - LOWER LIMIT Etmin2 (◎○) [μm] | DE1 (Dt/Etmax1) | DE2 (Dt/Etmax2) | ED1 (Etmax1/Dt) | ED2 (Etmax2/Dt) |
|---|---|---|---|---|---|---|---|---|
| 1.5 | 0.150 | 0.155 | 0.015 | 0.010 |  |  |  |  |
| 1.2 | 0.140 | 0.150 | 0.015 | 0.010 | 9.7 | 10.0 | 0.10 | 0.10 |
| 0.8 | 0.125 | 0.135 | 0.015 | 0.010 | 8.0 | 8.6 | 0.13 | 0.12 |
| 0.6 | 0.115 | 0.130 | 0.015 | 0.010 | 5.9 | 6.4 | 0.17 | 0.16 |
| 0.4 | 0.095 | 0.110 | 0.015 | 0.010 | 4.6 | 5.2 | 0.22 | 0.19 |
| 0.3 | 0.080 | 0.090 | 0.015 | 0.010 | 3.6 | 4.2 | 0.28 | 0.24 |
| 0.2 | 0.060 | 0.070 | 0.015 | 0.010 | 3.3 | 3.8 | 0.30 | 0.27 |
| 0.1 | 0.035 | 0.040 | 0.015 | 0.010 | 2.9 | 3.3 | 0.35 | 0.30 |
|  |  |  |  |  | 2.5 | 2.9 | 0.40 | 0.35 |

(a)

(b)

(c)

(d)

CAPACITOR AND METHOD FOR MANUFACTURING SAME

RELATED APPLICATIONS

This application is a national phase of PCT/JP2022/029625, filed on Aug. 2, 2022, which claims priority to JP Application No. 2021-130498, filed on Aug. 10, 2021. The contents of these applications are hereby incorporated by reference in their entirety.

TECHNICAL FIELD

The present invention relates to a capacitor and a method for manufacturing the same.

BACKGROUND ART

A polymer multi-thin-layer capacitor described in Japanese Laid-open Patent Publication No. 2021-19133 includes: a chip-shaped multilayer body in which dielectric layers and internal electrode layers, each of which includes a first metal layer formed by vapor deposition of a first metal on a dielectric layer and a second metal layer formed by vapor deposition of a second metal on the first metal layer, are alternately laminated (stacked) and joined together; and external electrodes respectively formed at one end and another end of the multilayer body. The multilayer body includes first regions, where dielectric layers on which the first metal is formed are alternately laminated, and edge regions, where the second metal is formed on parts of each first metal layer connected to the one end and the other end and are alternately laminated. The first region includes a region that functions as a capacitor and the edge regions are formed with heavy edges.

SUMMARY OF INVENTION

In contrast to film capacitors, polymer multi-thin-layer capacitors can have dielectric layers whose thickness is 1.5 µm or less, which makes it possible to provide a small capacitor with a high withstand voltage and a low ESR (Equivalent Series Resistance). It is important to achieve more favorable connectivity with external electrodes and more favorable withstand voltage characteristics.

In recent years, there has been demand for capacitors with an even higher withstand voltage and a lower ESR. Accordingly, heavy edge structures have been adopted. By using the heavy edge structure, while the connecting parts that connect to external electrodes are made thicker, the thickness of the electrode part (internal electrode part) of the capacitor body is reduced to sufficiently increase the surface resistivity (sheet resistivity) to increase the withstand voltage. Also, to further lower the connection resistance of the connecting parts and sufficiently reduce the ESR, there is a tendency for the thickness of the connecting parts that connect to the electrodes to become even thicker.

On the other hand, the inventors of the present application found that when the edge parts to be connected to the external electrodes are made even thicker, an excessive thickness can cause connections with external electrodes produced by metallikon (metallization, metal spay, with layer or layers formed by metallic spray) to become unstable, making it difficult to provide capacitors with stable performance at low cost. In other words, although it was believed that electrode layers should preferably be thick at the connecting parts to achieve favorable connection performance for the connections to external electrodes, the inventors of the present application found that in a multi-thin-layer type (thin film-type multilayer) capacitor, to achieve the desired connection performance, there is a limit, at the connection boundaries, on the thickness of the electrode layers with respect to the thickness of the dielectric layers, making it necessary to provide dielectric layers with a predetermined thickness relative to the thickness of the electrode layers. The inventors also found that as an index of the condition at the connection boundaries, when a ratio DE (DE=Dt/Et) is set between the thickness Dt of the dielectric layers and the thickness Et of the electrode layers, the ratio DE has a minimum value, so that the ratio DE should be at least a predetermined value (first value or minimum value) DEmin. This means that when a ratio ED (where ED=Et/Dt) is set between the thickness Et of the electrode layers and the thickness Dt of the dielectric layers, the ratio ED has a maximum value and the ratio ED should not exceed a predetermined value (maximum value) EDmax.

That is, one aspect of the present invention is a capacitor including a main body in which dielectric layers and electrode layers are alternatively laminated, and an external electrode ("metallikon" layer) connected to at least a part of the main body by metallikon, wherein each of the dielectric layers has a thickness Dt at a connection boundary where the main body is connected to the external electrode, each of the electrode layers has a thickness Et at the connection boundary, and a ratio between the thickness Dt and the thickness Et is at least a first value Demin.

In addition, the inventors of the present application found that when a minimum value Dt1 is set for the thickness Dt of each dielectric layer at the connection boundary, there is correlation between the first value DEmin with the minimum set value Dt1 that can be expressed by a linear expression. The minimum value DEmin of the ratio DE between the thickness Dt of each dielectric layer and the thickness Et of each electrode layer at the connection boundary where the main body is connected to the external electrode may satisfy the following Conditions (1) and (2)

$$DE\min \geq a \times Dt1 + b \quad (1)$$

$$0.1 \ \mu m \leq Dt1 \leq Dt \leq 1.5 \ \mu m \quad (2)$$

where a and b are coefficients.

In this capacitor, the thickness Et of each electrode layer at the connection boundary may satisfy the following Condition (7).

$$Et \leq Dt/DE\min \quad (7)$$

Also in this capacitor, the thickness Dt of the dielectric layer at the connection boundary may satisfy the following Condition (8).

$$Dt \geq DE\min \times Et \quad (8)$$

The first value DEmin may satisfy the following Condition (3a).

$$DEmin \geq 5.0Dt1 + 1.7 \quad (3a)$$

Each electrode layer may include at least one of aluminum, zinc, copper, gold, silver, and an alloy containing any of aluminum, zinc, copper, gold, and silver. Each electrode layer may include an internal electrode part and a heavy edge portion. The heavy edge portion includes a connecting part that connects to the external electrode and is thicker than the internal electrode part, and the heavy edge portion may include any of aluminum, zinc and an alloy of aluminum or zinc. Each electrode layer may include a dummy edge portion where a connecting part, which connects to the external electrode, is separated from the internal electrode part. Each dielectric layer may include thermosetting resin. The external electrode which is produced by metallikon (metallization, metallic spraying) may contain at least one of aluminum, zinc, copper, and an alloy containing any of aluminum, zinc, and copper.

Another aspect of the present invention is a method of manufacturing a capacitor including a main body in which dielectric layers and electrode layers are alternatively laminated and an external electrode connected to at least a part of the main body. The method of manufacturing includes laminating the dielectric layers and the electrode layers so that a ratio between a thickness Dt of each dielectric layer at a connection boundary where the main body is connected to the external electrode and a thickness Et of each electrode layer at the connection boundary is at least a first value DEmin.

BRIEF DESCRIPTION OF DRAWINGS

FIG. 4 depicts evaluation results for Specific Example 1.

FIG. 5 depicts evaluation criteria.

FIG. 6 collectively depicts evaluation results for Specific Example 1.

FIG. 9 collectively depicts evaluation results for Specific Example 2.

FIG. 12 collectively depicts evaluation results for Specific Example 3.

DESCRIPTION OF EMBODIMENTS

Figure 1:
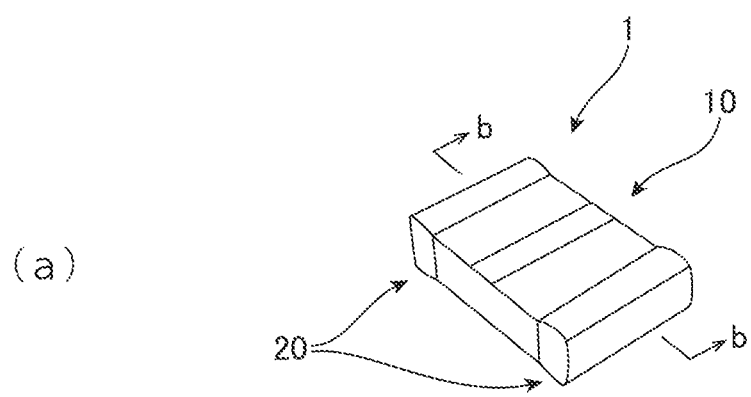
FIG. 1 schematically depicts a capacitor.
Figure 1:
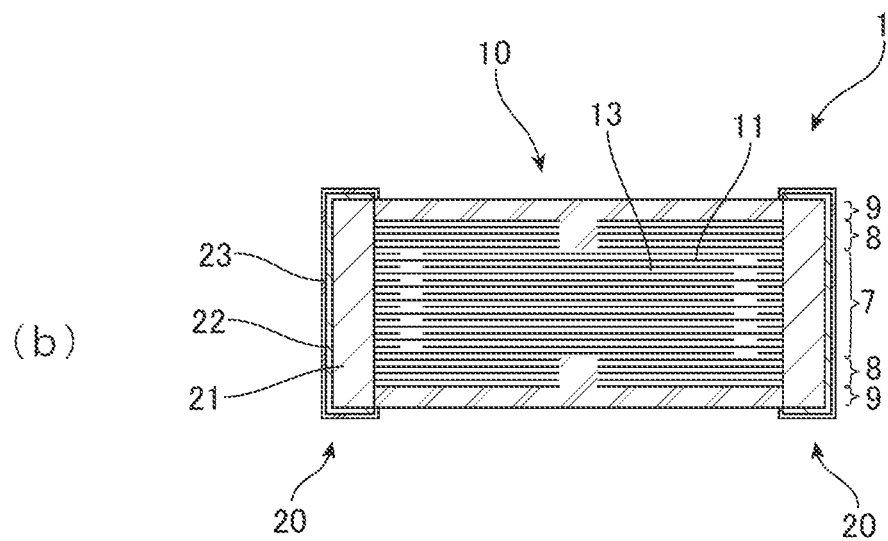

FIG. 1 depicts one example of a capacitor according to the present invention. A known example of a capacitor 1, which includes a main body (main body portion, capacitor core, core, laminated body, multilayer body, or multilayer product) 10 in which dielectric layers and electrode layers are alternatively laminated (stacked) and integrated, and external electrodes 20 each connected to the main body 10, is a polymer multi-thin-layer capacitor (Polymer Multi-Layer CAPacitor, thin-film polymer multilayer capacitor). The capacitor 1, whose external appearance is depicted in FIG. 1(a), is one example of a polymer multi-thin-layer capacitor. As depicted in the cross-sectional view in FIG. 1(b), the main body 10 includes active layers 7, which are provided at the center in the thickness direction and realize a capacitance, dummy layers 8 that are disposed above and below the active layers 7 and do not realize a capacitance, and protective layers 9 disposed above and below the dummy layers 8. The active layers 7 and the dummy layers 8 are constructed by laminating resin layers (dielectric layers) 13 and electrode layers 11 each other, but the protective layers 9 are composed of only resin layers. The external electrodes 20 are formed by metallikon (metallization, metallic spraying, with layers manufactured by metallic spray) so as to be contacted (connected, joined) to the electrode layers 11 and the resin layers 13 in the active layers 7 and the dummy layers 8, and each include an internal metallikon layer (metallized layer, as one example, brass metallikon) 21, a copper plating layer 22 for covering the periphery of the internal metallikon layer 21, and a tin plating layer 23 for further covering the outside.

Figure 2:
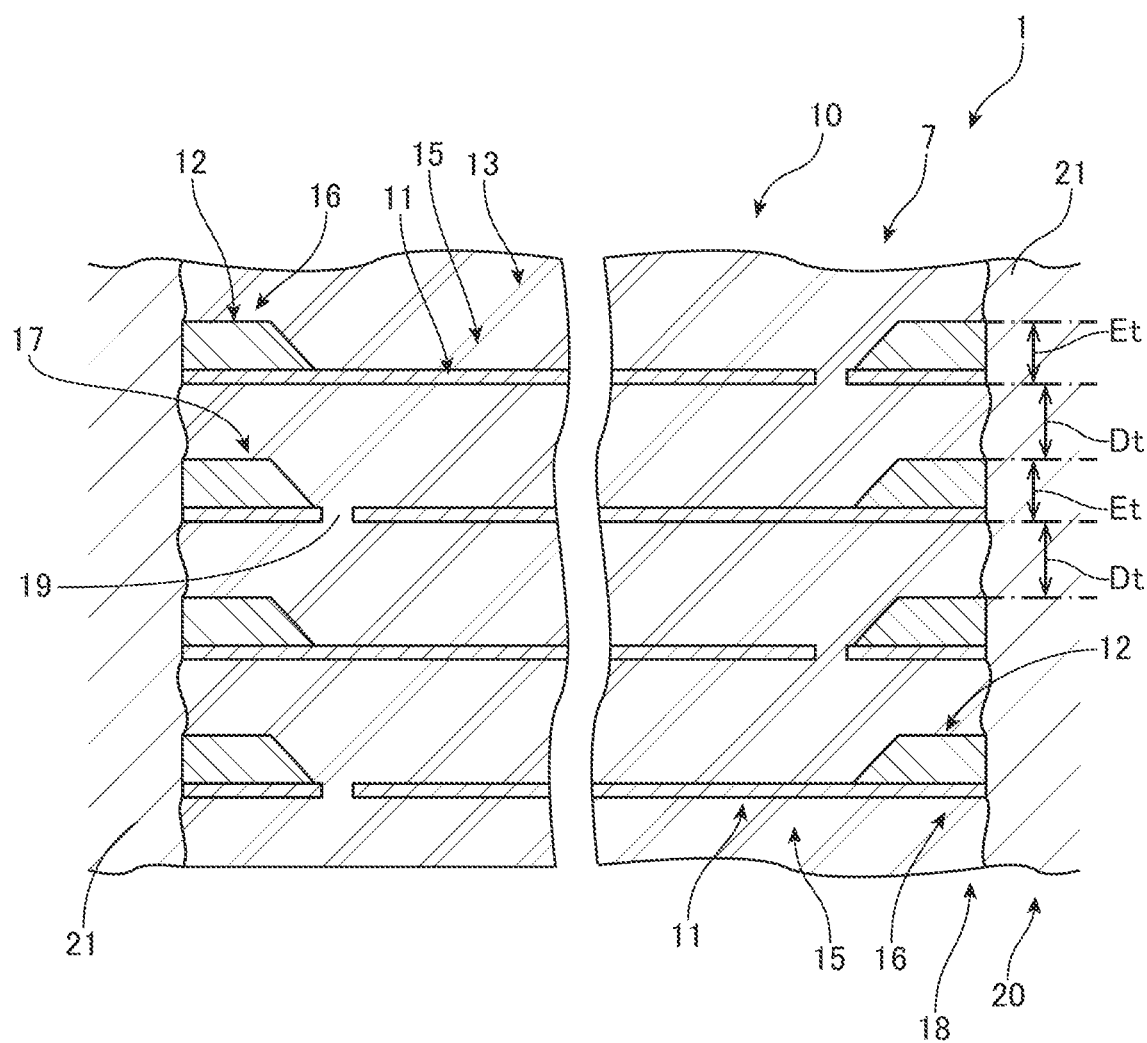
FIG. 2 is a cross-sectional view schematically depicting active layers (multilayer body).

FIG. 2 depicts an enlarged cross section of a part of the active layers 7 of the main body 10. The active layers 7 of the main body 10 is a part where the dielectric layers 13 and the electrode layers 11 are stacked alternatively. End portions (side surfaces, edge portions, connecting parts, connecting regions or connection boundaries) 18 of the dielectric layers 13 and the electrode layers 11 are joined (connected, mated) to the metallikon layer 21 of each external electrode 20. The electrode layers 11 are also electrically connected to the metallikon layers 21. The electrode layers 11 each includes an internal electrode part 15 in the form of a thin layer film which is in wide contact with dielectric layers 13 up and down in the active layers 7 and forms a capacitance, and edge portions 16 that are connected to the external electrodes 20 (the metallikon layers 21). One example of the edge portions are heavy edge portions 16 where the connecting parts (connection boundaries) 18 that connect to the external electrodes 20 have been made thicker than the internal electrode part 15. In the present embodiment, each heavy edge portion 16 that forms the electrode thickness of an electrode layer 11 at a connection boundary 18 is composed of the electrode layer 11 itself and a layer 12 that is laminated (stacked) on the electrode layer 11. To provide a capacitor 1 with a high withstand voltage, it is desirable to reduce the thickness of the internal electrode layer (internal electrode part) 15. As examples, the thickness of the internal electrode layer 15 may be 0.01 μm, or may be even thinner at 0.005 μm (5 nm). On the other hand, when considering the connection to the external electrodes 20, it is believed that a thickness of around 0.01 μm or greater is required. Heavy edge portions 16 may be provided in a capacitor 1 equipped with thin layer-type internal electrode parts 15. Note that if the internal electrode parts 15 are sufficiently thick, it may not be necessary to provide the heavy edge portions 16.

One example of a resin for forming the dielectric layers 13 is a thermosetting resin including acrylic polymer. One example of a resin that can be used in the polymer multi-thin-layered capacitor 1 is a polymer obtained by polymerizing one or more of tricyclodecane dimethanol dimethacrylate and tricyclodecane dimethanol diacrylate. However, the resin that constructs the dielectric layers 13 is not limited to these. To provide a small, thin, and high-capacity capacitor, the dielectric layers 13 may be made sufficiently thin and stacked in a sufficient number. As examples, the thickness of the dielectric layers 13 may be 0.1 to 1.5 μm, or 0.2 to 1.2 μm, and the number of layers to be stacked may be 1000 or higher. Dielectric layers 13 of a predetermined thickness can be obtained by vapor deposition of a thermosetting resin as a monomer in a reduced pressure environment (that is, in a vacuum) and curing the resin through irradiation with an electron beam or the like. A capacitor 1 with dielectric layers 13 made of thermosetting resin has a higher withstand temperature than a capacitor made of a thermoplastic resin, is compatible or applicable with reflowing, and can therefore be provided as an element that is more suited to surface mounting.

The electrode layers 11 may be formed of a conductive metal, for example at least one of aluminum, zinc, copper, gold, silver, and an alloy containing any of these metals. As a capacitor 1 for high-voltage applications, the withstand voltage can be improved by reducing the thickness of the electrodes that function as a capacitor, that is, the internal electrode portions 15. As one example, the withstand voltage may be 400V or higher, and the thickness of the internal electrode portions 15 may be around 10 to 160 nm, or around 15 to 150 nm. Surface resistivity may be used to control the thickness of the thin layer film electrodes, and the surface resistivity of the internal electrode portions 15 may be 5 to 80Ω/square (Ω/sq.), 15 to 80Ω/sq., or 20 to 80Ω/sq.

Each of the electrode layers 11 of the capacitor 1 may further include dummy heavy edge portion 17 (dummy edge portion) that is separated from each internal electrode part 15 by a gap 19. Since the dummy edge portions 17 are separated from the internal electrode parts 15 respectively, the dummy edge portions 17 do not contribute to the capacitance of the capacitor 1. However, such dummy heavy edge portions 17 are useful in achieving mechanically strong connections with the metallikon layers 21 of the external electrodes 20, because the connections with the metallikon layers 21 are maintained or strengthened by the dummy heavy edge portions 17 acting in concert with the heavy edge portions 16 that are integrated with the internal electrode parts 15. Note that in the present embodiment, the layer 12 that constructs a heavy edge portion 16 may be laminated above an electrode layer 11, may be laminated below the electrode layer 11, or may be laminated on both the top and bottom surfaces. The heavy edge portions 16 are not limited to having a two-layer structure, and may have a single-layer structure, or may be constructed of three or more layers.

Although the withstand voltage can be increased when the electrode layers 11 are made thinner, the loss factor (tan δ) and the equivalent series resistance (ESR) both increase, so that the performance as a capacitor tends to decrease. For this reason, the configuration of the connecting parts 18 of the electrode layers 11 and the external electrodes 20 is important. Conventionally, it was believed that even when the internal electrode parts 15 are thin, by making the connecting parts 18 that connect to the external electrodes 20, in the present embodiment, to the metallikon layer 21 sufficiently thick, it is possible to reduce the tan δ and the ESR, to improve the frequency characteristics, and to produce a capacitor compatible with large currents.

In most multilayer capacitors, such as film capacitors and polymer multi-thin-layer capacitors, that have been commercialized, metallikon is used as the method of connecting the multilayer body (main body) 10 and the external electrodes 20. At present, it is difficult for methods aside from metallikon to achieve the necessary mechanical strength for a capacitor. For a conventional film capacitor, there is no apparent limit on the thickness of the electrode layers (the metal layers) at the connections with the metallikon layers, which is believed to be due to reasons such as the thickness of the dielectric layers being several μm or more and the films being staggered, and heavy edge structures may be used even in film capacitors to provide sufficient electrode thickness at the connecting parts.

On the other hand, as described in detail below, from research performed by the inventors of the present application, it was found that if the thickness Et (in the present embodiment, the thickness of the heavy edge portions 16) of the electrode layer 11 at the connecting parts (connection boundaries) 18 between the main body 10 and the external electrodes 20 is too thick, it is not possible to form connections with the metallikon layers 21 and/or the connection resistance increases. In particular, this trend was clearly exhibited in products, such as the capacitor 1 described in the following embodiments, where the thickness Dt of the dielectric resin layer (or simply "dielectric layer") 13 is less than 1.5 μm and furthermore where the thickness Dt is less than 1.0 μm.

One apparent reason why it is not possible to form connections to the metallikon layers 21 and/or the connection resistance increases when the thickness Et of the electrode layers 11 is too large is that when the thickness Dt of the dielectric layers 13 is not sufficiently large relative to the thickness Et of the electrode layers 11 at the connection boundaries 18, the gaps (distances) between the metal layers of the electrode layers 11 that are exposed by a plasma ashing treatment are narrow and the large thickness of the electrode layers will increase the density of metal. This means that the semi-molten metal that is injected or sprayed by a metallikon device to form a metallikon layer 21 will stop before the edges of the dielectric layers 13, without reaching the dielectric layers 13, which prevents the applied metal from biting into or engaged with the multilayer structure 7 of the main body 10 and achieving sufficient connection strength. As one example, it can be assumed that the metal of the electrode layers 11 exposed at the connection boundaries 18 acts as a cushion or barrier. Since the expression "thicker" for the metal parts of the exposed electrode layers 11, for example, the heavy edge portions 16, still means a thickness of several tens of nanometers to several hundreds of nanometers, using only the electrode layers 11 exposed at the connection boundaries 18 with such thickness to join or connect to the metal applied by metallikon, without or less contacting with the dielectric layers, will result problems such as insufficient strength and a tendency to break easily and difficulty in achieving sufficient mechanical connectivity strength for keeping the electrical connections.

Accordingly, to obtain favorable electrical connections and connection strength between the main body 10 and the external electrodes 20, the metal of the metallikon layer 21 needs to bite into (dig into, engaged with) the entire edge surface of multilayer structure 7 including the dielectric layers 13.

Figure 3:
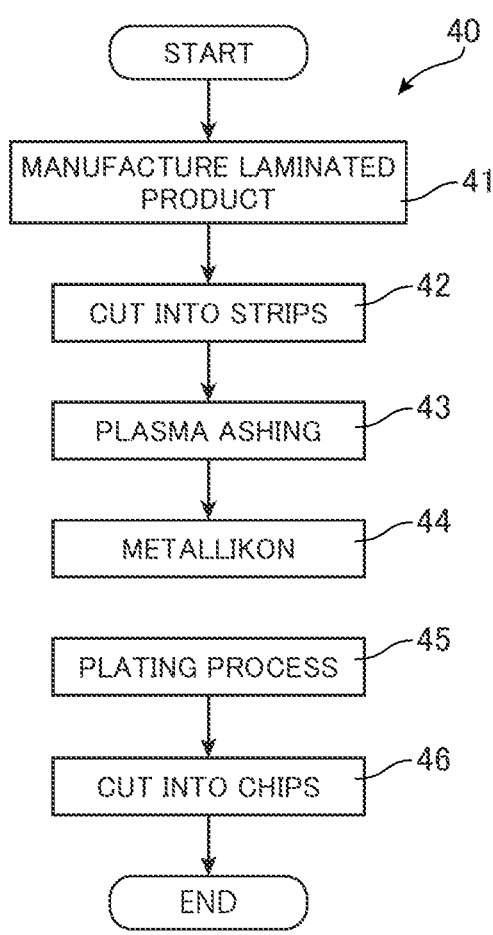
FIG. 3 is a flowchart schematically depicting a manufacturing process of a capacitor.

FIG. 3 depicts one example method of manufacturing the capacitor 1. In this method of manufacturing 40, in step 41, a laminated product (laminated structure, multilayered structure, multilayered product) that serves as the base of the main body (main body portion) 10 is manufactured. One example method of manufacturing a laminated structure is a method in which each layer is formed by vapor deposition. A known apparatus alternately forms a dielectric layer 13 and an electrode layer 11 by vapor deposition on a drum that rotates in a reduced pressure environment (a vacuum environment) inside a vacuum chamber and thereby manufactures a laminated structure as a base for a plurality of main bodies 10. The laminated structure may be manufactured using another method, such as coating or printing. The thermosetting resin deposited as the dielectric layers 13 may be cured by an electron beam irradiation device or the like to form layer films as the dielectric layers 13. In addition, the surface of a dielectric layer 13 may be plasma-treated by a plasma treatment apparatus in readiness for the next manufacturing process. Before depositing an electrode layer 11, a patterning unit may apply an oil margin, which is used to pattern the electrode layer 11, on the dielectric layer 13 and thereby form an inner margin.

When each electrode layer 11 is formed in step 41, the heavy edge portion 16 and the dummy edge portion 17 are formed. Accordingly, in step 41, the main bodies 10 are manufactured by laminating the dielectric layers 13 and the electrode layers 11 so that the film thickness Dt at the connection boundary 18 of each dielectric layer 13 and the film thickness Et at the connection boundary of each electrode layer 11 have predetermined values. In place of forming inner margins via the oil margins, a method that forms margins at the edges can also be used. However, since the contact parts (that is, the connection boundaries) are affected by the margin oils, there is a high risk that quality will not be stable. In addition, the dummy edge portions (dummy heavy edge portions) 17 are parts on the opposite side that are cut off from the necessary parts of the heavy edge portions 16 during the cutting into strips in the following process, which means that each heavy edge portion 16, which is connected to the electrode layer 11, and each dummy edge portion 17, which is separated from the electrode layer 11 by a margin, are formed at the same time when cutting into strips. This means that it is possible to prevent the generation of redundant parts and unnecessary cutting steps. Accordingly, forming the inner margins using oil margins and providing the dummy edge portions 17 as in the present embodiment is effective for manufacturing the capacitor 1 that has stable performance, and contributes to an improvement in manufacturing efficiency. For this reason, it would be valid to consider including the dummy edge portions 17 in each of the specific examples described below.

In step 42, the laminated product is cut into strips to form the main bodies 10 that are in a strip (stick)-like state. The strip-like main bodies 10 may be formed directly from the laminated product, or the strip-shaped main bodies 10 may be manufactured by way of other processes, such as treatment with a flattening press or a card cutting process. In step 43, plasma ashing is performed on the surfaces cut into strips as the connecting parts (connection boundaries or connection surfaces) 18 that connect to the external electrodes 20. As one example, plasma ashing may be performed using a gas mixture of oxygen and carbon tetrafluoride.

In step 44, the metallikon layers 21 of the external electrodes 20 are formed by metallikon process (metallization, spraying metal) on the connection boundaries 18 that have been subjected to plasma ashing. The metallikon layers 21 are manufactured by melting metal containing, for example, zinc, copper, aluminum, or an alloy, such as brass, containing any of these metals and arc spraying at an air pressure of about 0.2 to 0.8 MPa from a distance of 50 to 200 mm (metallikon distance) onto the connection boundaries 18.

In step 45, the copper plating layer 22 and the tin plating layer 23 are formed in that order by electrolytic plating or the like. The tin plating layer 23 is effective in improving the solder wettability of the external electrodes 20. After this, any necessary treatments, such as a heat treatment, are performed on the external electrodes 20. In addition, in step 46, the strip-shaped main bodies 10 on which the external electrodes 20 have been formed are cut together with the external electrodes 20 into chips, thereby manufacturing the capacitors 1 in which the external electrodes 20 are connected to the main body 10. Note that the steps depicted in FIG. 3 illustrate typical processes, and other processes may also be further performed.

FIG. 4 depicts one example of the results of evaluating the performance of capacitors 1 which have been manufactured by changing the thickness Dt of each dielectric layer 13 at the connection boundaries 18 and the thickness Et of each electrode layer 11 at the connection boundaries 18. In this experiment (Specific Example 1), the internal electrode part 15 of the electrode layer 11 is made of aluminum with a film thickness of 5 nm, the heavy edge portion 16 is produced (formed) with an aluminum layer as the layer 12, and the thickness Et of the heavy edge portion was changed as depicted in FIG. 4. The dielectric layers 13 are made of resin and use tricyclodecane dimethanol diacrylate. The thickness of the main body 10 is 1.4 mm, and the metallikon layers 21 of the external electrodes 20 are metallikon (metallized) zinc layers. In addition, at the boundary parts 18, before the metallikon layers 21 are formed, the heavy edge portions 16 at the ends of the electrode layers 11 are exposed by a plasma treatment, and undulations (concavo-convex) of 20 to 50 μm were formed in the external electrode bonding surfaces of the main body 10. After this, the metallikon layers 21 were formed by arc spraying zinc at a metallikon distance of 125 mm and an air pressure of 0.5 MPa.

FIG. 5 depicts criteria (evaluation criteria) for determining the characteristics. The characteristics of the respective manufactured capacitors 1 were determined based on the capacitance achieved when a 1 kHz alternating current was applied and the loss coefficient (tan δ). When there is deterioration in the connections with the metallikon layers 21, deterioration in the physical connection strength will also occur after deterioration has occurred in the electrical characteristics. Out of the electrical characteristics, tan δ deteriorates first, before a decrease in the "capacitance appearance rate" (the actual capacitance realized or detected relative to the designed capacitance value). As depicted in FIG. 4, it is found that when the thickness Et of each electrode layer 11 exceeds a predetermined value with respect to a predetermined thickness Dt of each dielectric layer 13, the characteristics of the capacitor 1 will deteriorate. Accordingly, it is found that if the thickness Et of each electrode layer 11 is too thick with respect to the thickness Dt of each dielectric layer 13, the characteristics will deteriorate, meaning that there is an upper limit (maximum value) for the thickness Et of the electrode layer 11. Expressed the other way, it is found that if the thickness Dt of the dielectric layer 13 is too small with respect to the thickness Et of the electrode layer 11, the characteristics will deteriorate, meaning that there is a lower limit (minimum value) for the thickness Dt of the dielectric layer 13 with respect to the thickness Et of the electrode layer 11.

FIG. 6 summarizes the evaluation results for Specific Example 1. FIG. 6 depicts an upper limit Etmax1 of the thickness Et of the electrode layer 11 in the boundary regions 18 that satisfies the evaluations ⊚ (double circle), ○ (circle), and Δ, an upper limit Etmax2 of the thickness Et in the boundary regions 18 of the electrode layer 11 that satisfies the evaluations ⊚ (double circle) and ○ (circle), a lower limit Etmin1 of the thickness Et of the electrode layer 11 in the boundary regions 18 that satisfies the evaluations ⊚ (double circle), ○ (circle) and Δ, and a lower limit Etmin2 of the thickness Et of the electrode layer 11 in the boundary regions 18 that satisfies the evaluations ⊚ (double circle) and ○ (circle), with respect to the thickness Dt in the boundary regions 18 of the dielectric layer 13.

According to these evaluation results, it is found that the lower limits Etmin1 and Etmin2 of the thickness Et of the electrode layers 11 are both constant and do not depend on changes in the thickness of the dielectric layer 13. On the other hand, the upper limits Etmax1 and Etmax2 of the thickness Et of the electrode layer 11 both increase as the thickness Dt of the dielectric layer 13 increases. However, it was found that these ratios are not constant, and although the upper limit of the thickness Et of the electrode layer 11 increases as the thickness Dt of the dielectric layer 13 increases, no proportional relationship is observed.

FIG. 6 further depicts, for a ratio DE (DE=Dt/Et) between the thickness Dt of the dielectric layer 13 and the thickness Et of the electrode layer 11 at the connection boundaries 18 where the main body 10 is connected to the external electrodes 20, a value DE1 (DE1=Dt/Etmax1) up to which an evaluation of Δ is allowed and a value DE2 (DE2=Dt/Etmax2) up to which an evaluation of ○ (circle) is allowed. The evaluation A and the evaluation ○ (circle) are evaluations indicating the minimum value Dt1 of the thickness Dt of the dielectric layer 13, with the values DE1 and DE2 as the minimum values DEmin for each of these evaluations. Together with these, their reciprocals, that is, a value ED1 (ED1=Etmax1/Dt) up to which an evaluation of Δ for the ratio ED (ED=Et/Dt) between the thickness Et of the electrode layer 11 and the thickness Dt of the dielectric layer 13 at the connection boundaries 18 is allowed and a value ED2 (ED2=Etmax2/Dt) up to which an evaluation of ○ (circle) is allowed are depicted. The values ED1 and ED2 are the maximum values EDmax for each of these evaluations.

Figure 7:
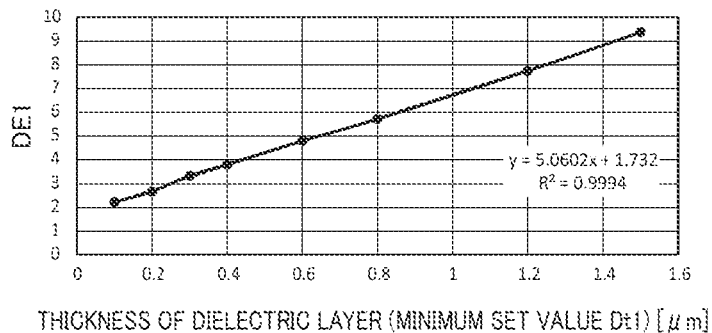
FIG. 7 depicts correlations based on the evaluation results of Specific Example 1.
Figure 7:
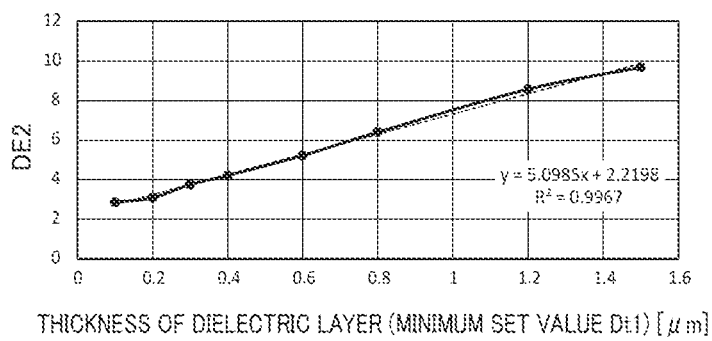
Figure 7:
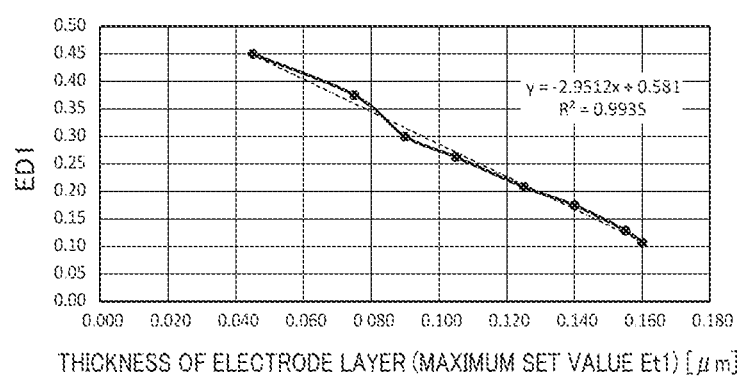
Figure 7:
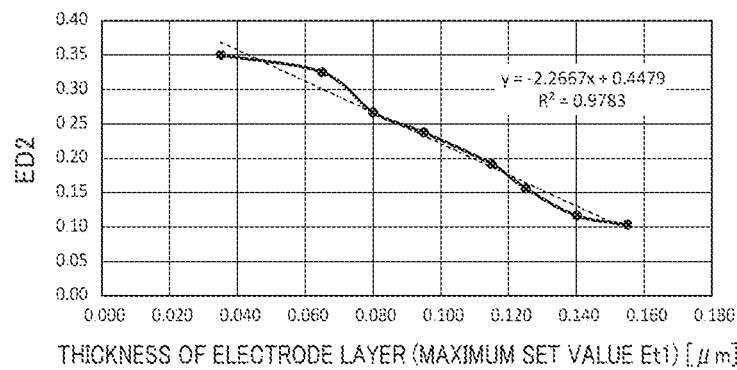

In FIG. 7(*a*), the value DE1 is depicted with respect to the minimum value of the thickness Dt of the dielectric layer 13 (the "minimum set value Dt1", which is a thickness at which an evaluation of A or an evaluation of ○ (circle) is obtained). In FIG. 7(*b*), the value DE2 is depicted with respect to the minimum set value Dt1 of the thickness Dt of the dielectric layer 13. In FIG. 7(*c*), the value ED1 is depicted with respect to the maximum value Etmax1 (or "maximum set value Et1") of the electrode layer 11. In FIG. 7(*d*), the value ED2 is depicted with respect to the maximum value Etmax2 (maximum set value Et1) of the electrode layer 11. As it is found from the graphs, the values DE1 and DE2 exhibit strong correlation with the minimum set values Dt1 of the thickness Dt of the dielectric layer 13 as expressed by a linear equation, and the values ED1 and ED2 also exhibit correlation with the maximum values Et1 of the thickness Et of the electrode layer 11 as expressed by a linear equation. Accordingly, by setting the minimum value Dt1, that is, by determining the minimum set value Dt1, the minimum values of DE1 and DE2 can be obtained. Also, by setting the maximum value Et1, that is, by determining the maximum set value Et1, the maximum value of ED1 and ED2 can be obtained.

The correlation function between the values DE1 and the minimum set values Dt1 (μm) of the thickness of the dielectric layer 13 depicted in FIG. 7(*a*) is given by the following formula (ex1a), with a correlation coefficient R2 of 0.9994.

$$DE1 = 5.0602 Dt1 + 1.732 \quad \text{(ex1a)}$$

The correlation function between the values DE2 and the minimum set values Dt1 (μm) of the thickness of the dielectric layer 13 depicted in FIG. 7(*b*) is given by the following formula (ex1b), with a correlation coefficient R2 of 0.9967.

$$DE2 = 5.0985 Dt1 + 2.2198 \quad \text{(ex1b)}$$

The correlation function between the values ED1 and the maximum set values Et1 (μm) of the thickness of the electrode layer 11 depicted in FIG. 7(*c*) is given by the following formula (ex1c), with a correlation coefficient R2 of 0.9935.

$$ED1 = -2.9512 Et1 + 0.581 \quad \text{(ex1c)}$$

The correlation function between the values ED2 and the maximum set values Et1 (μm) of the thickness of the electrode layer 11 depicted in FIG. 7(*d*) is given by the following formula (ex1d), with a correlation coefficient R2 of 0.9783.

$$ED2 = -2.2667 Et1 + 0.4479 \quad \text{(ex1d)}$$

Figure 8:
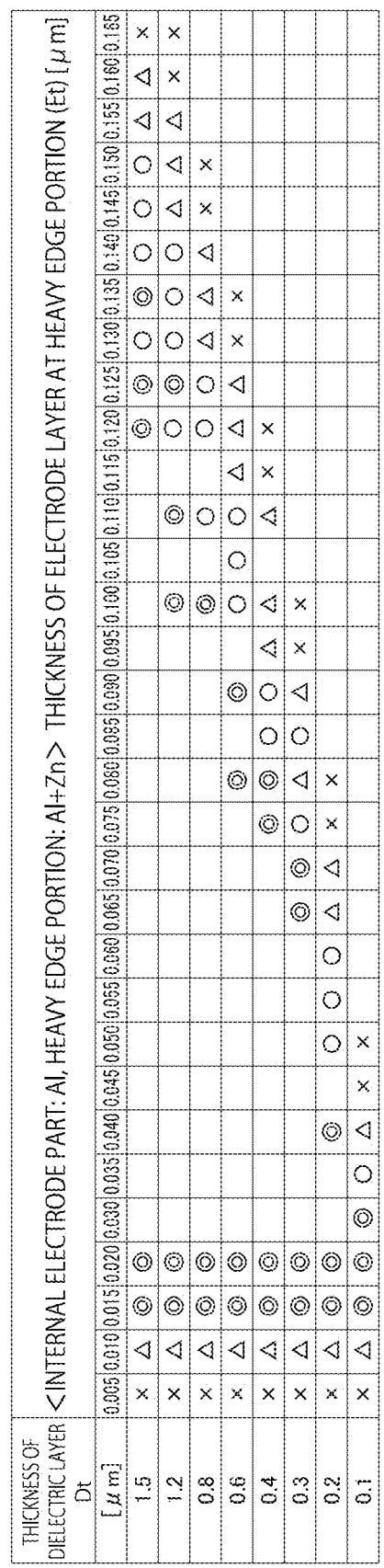
FIG. 8 depicts evaluation results for Specific Example 2.

As a different example, FIG. 8 depicts the results of evaluating the performance of capacitors 1 which have been manufactured by changing the thickness Dt of the dielectric layer 13 in the boundary regions 18 and the thickness Et of the electrode layer 11 in the boundary regions 18. In this experiment (Specific Example 2), the internal electrode part 15 of each electrode layer 11 is made of aluminum with a thickness of 5 nm, a layer 12 made of zinc is formed to construct each heavy edge portion 16, and the thickness Et of the heavy edge portion 16 was changed by the layer 12 as depicted in FIG. 8. The other conditions were the same as Specific Example 1, and the metallikon layer 21 was also produced with the same conditions. For this example also, the characteristics of the various capacitors 1 were evaluated using the evaluations ⊚ (double circle), ○ (circle), Δ, and × based on the criteria for determining the characteristics indicated in FIG. 5.

FIG. 9 summarizes the evaluation results. For this example also, it was found that the lower limits Etmin1 and Etmin2 of the thickness Et of the electrode layer 11 are both constant and do not depend on changes in the thickness of the dielectric layer 13. On the other hand, the upper limits Etmax1 and Etmax2 of the thickness Et of the electrode layer 11 both increase as the thickness Dt of the dielectric layer 13 increases. However, for this example, it was found that these ratios are not constant, and although the upper limit of the thickness Et of the electrode layer 11 increases as the thickness Dt of the dielectric layer 13 increases, no proportional relationship is observed. For this reason, FIG. 9 depicts the value DE1, the value DE2, the value ED1, and the value ED2 in the same way as for Specific Example 1 described above and FIGS. 10(a) to 10(d) depict the correlations between them.

Figure 10:
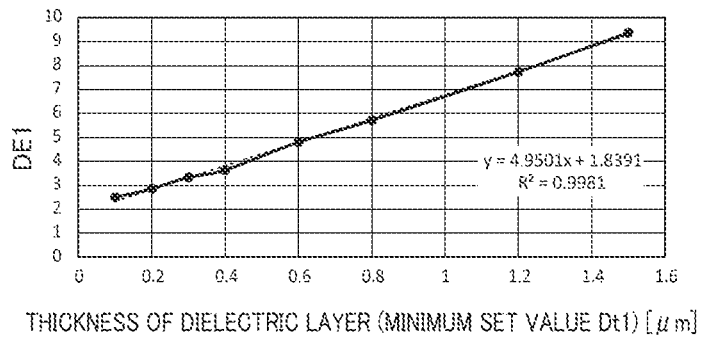
FIG. 10 depicts correlations based on the evaluation results of Specific Example 2.
Figure 10:
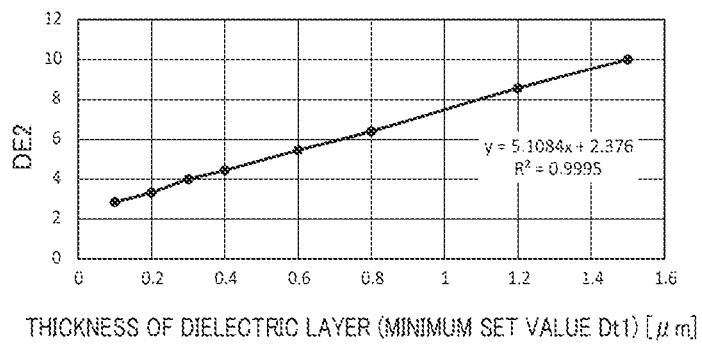
Figure 10:
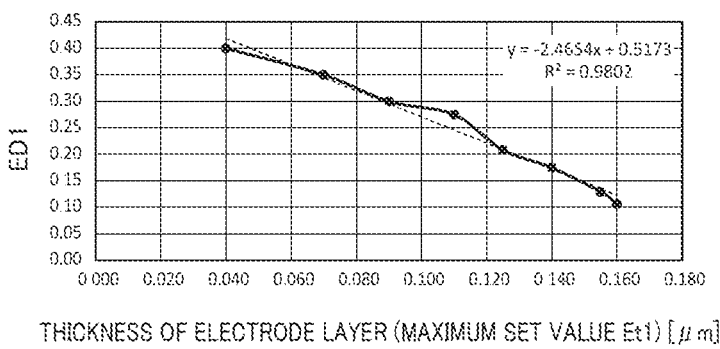
Figure 10:
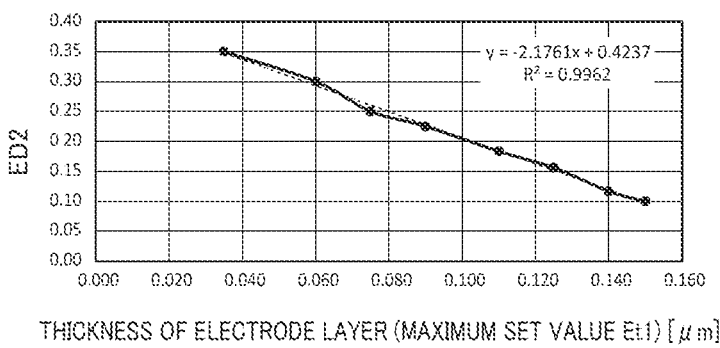

As depicted in FIGS. 10(a) to 10(d), for this example also, the values DE1 and DE2 exhibit strong correlation with the minimum set values Dt1 of the thickness Dt of the dielectric layer 13 as expressed by a linear equation, and the values ED1 and ED2 also exhibit correlation with the maximum values Et1 of the thickness Et of the electrode layer 11 as expressed by a linear equation. That is, the correlation function between the values DE1 and the minimum set values Dt1 (μm) of the thickness of the dielectric layer 13 depicted in FIG. 10(a) is given by the following formula (ex2a), with a correlation coefficient R2 of 0.9981.

$$DE1 = 4.9501 Dt1 + 1.8391 \qquad (\text{ex2a})$$

The correlation function between the values DE2 and the minimum set values Dt1 (μm) of the thickness of the dielectric layer 13 depicted in FIG. 10(b) is given by the following formula (ex2b), with a correlation coefficient R2 of 0.9995.

$$DE2 = 5.1084 Dt1 + 2.376 \qquad (\text{ex2b})$$

The correlation function between the values ED1 and the maximum set values Et1 (μm) of the thickness of the electrode layer 11 depicted in FIG. 10(c) is given by the following formula (ex2c), with a correlation coefficient R2 of 0.9802.

$$ED1 = -2.4654 Et1 + 0.5173 \qquad (\text{ex2c})$$

The correlation function between the values ED2 and the maximum set values Et1 (μm) of the thickness of the electrode layer 11 depicted in FIG. 10(d) is given by the following formula (ex2d), with a correlation coefficient R2 of 0.9962.

$$ED2 = -2.1761 Et1 + 0.4237 \qquad (\text{ex2d})$$

Figure 11:
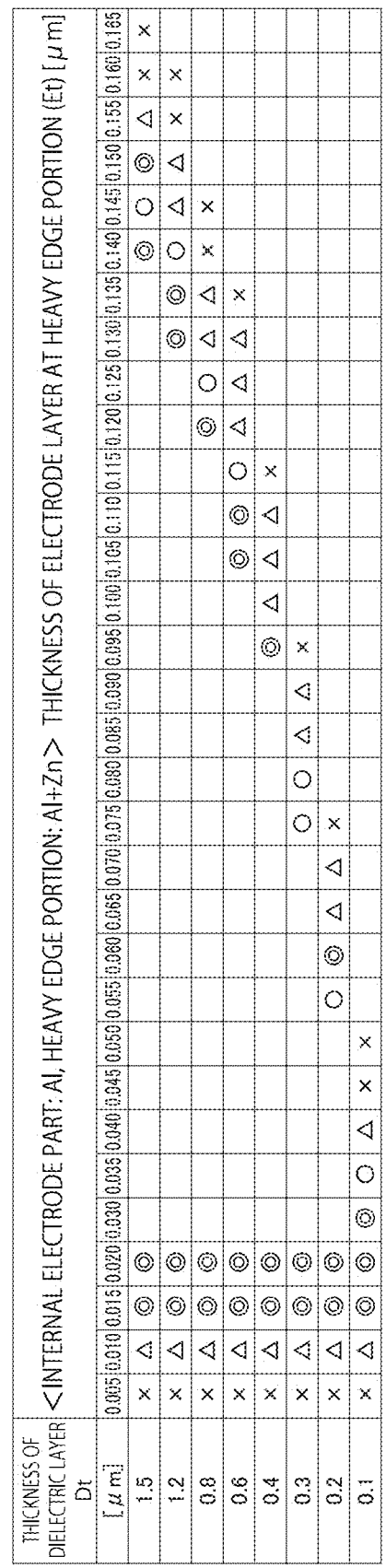
FIG. 11 depicts evaluation results for Specific Example 3.

As a further example, FIG. 11 depicts the results of manufacturing and evaluating the performance of capacitors 1 in which an aluminum metallikon layer 21 is formed on main bodies 10 provided with boundary regions 18 under the same conditions as in Specific Example 2. In this example (Specific Example 3), the metallikon layer 21 was produced by arc spraying aluminum at a metallikon distance of 125 mm and an air pressure of 0.5 MPa. For this example also, the characteristics of each capacitor 1 were evaluated as ⊚ (double circle), ○ (circle), Δ, and × based on the criteria for evaluating characteristics depicted in FIG. 5.

FIG. 12 summarizes the evaluation results. For this example also, it was found that the lower limits Etmin1 and Etmin2 of the thickness Et of the electrode layer 11 are both constant and do not depend on changes in the thickness of the dielectric layer 13. On the other hand, the upper limits Etmax1 and Etmax2 of the thickness Et of the electrode layer 11 both increase as the thickness Dt of the dielectric layer 13 increases. However, for this example, it was found that these ratios are not constant, and although the upper limit of the thickness Et of the electrode layer 11 increases as the thickness Dt of the dielectric layer 13 increases, no proportional relationship is observed. For this reason, FIG. 12 depicts the value DE1, the value DE2, the value ED1, and the value ED2 in the same way as for Specific Example 1 described above and FIGS. 13(a) to 13(d) depict the correlations between them.

Figure 13:
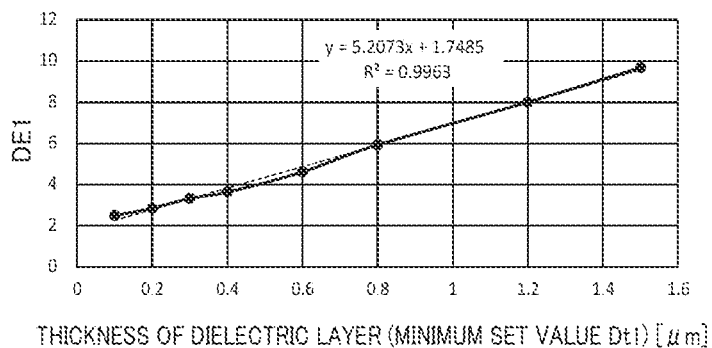
FIG. 13 depicts correlations based on the evaluation results of Specific Example 3.
Figure 13:
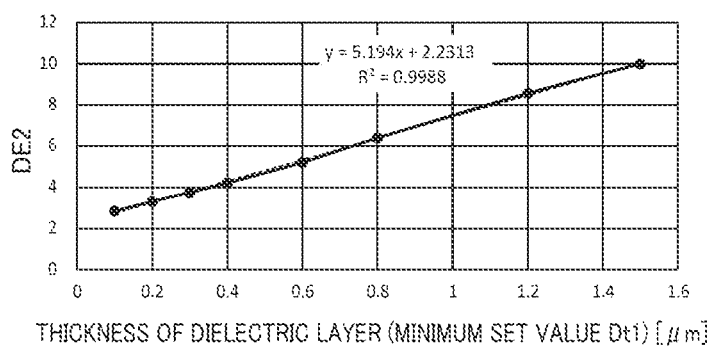
Figure 13:
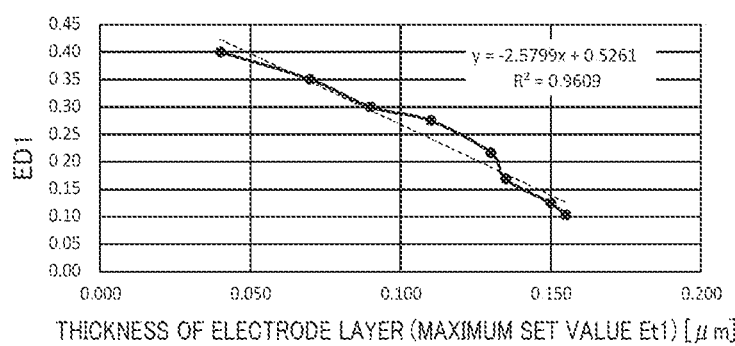
Figure 13:
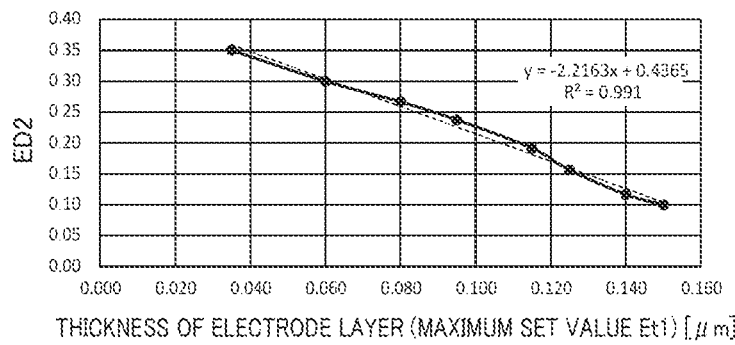

As depicted in FIGS. 13(a) to 13(d), for this example also, the values DE1 and DE2 exhibit strong correlation with the minimum set values Dt1 of the thickness Dt of the dielectric layer 13 as expressed by a linear equation, and the values ED1 and ED2 also exhibit correlation with the maximum values Et1 of the thickness Et of the electrode layer 11 as expressed by a linear equation. That is, the correlation function between the values DE1 and the minimum set values Dt1 (μm) of the thickness of the dielectric layer 13 depicted in FIG. 13(a) is given by the following formula (ex3a), with a correlation coefficient R2 of 0.9963.

$$DE1 = 5.2073 Dt1 + 1.7485 \qquad (\text{ex3a})$$

The correlation function between the values DE2 and the minimum set values Dt1 (μm) of the thickness of the dielectric layer 13 depicted in FIG. 13(b) is given by the following formula (ex3b), with a correlation coefficient R2 of 0.9988.

$$DE2 = 5.194 Dt1 + 2.2313 \qquad (\text{ex3b})$$

The correlation function between the values ED1 and the maximum set values Et1 (μm) of the thickness of the electrode layer 11 depicted in FIG. 13(c) is given by the following formula (ex3c), with a correlation coefficient R2 of 0.9609.

$$ED1 = -2.5799 Et1 + 0.5261 \qquad (\text{ex3c})$$

The correlation function between the values ED2 and the maximum set values Et1 (μm) of the thickness of the electrode layer 11 depicted in FIG. 13(d) is given by the following formula (ex3d), with a correlation coefficient R2 of 0.991.

$$ED2 = -2.2163 Et1 + 0.4365 \qquad (\text{ex3d})$$

From these Specific Examples, it was found that, as a condition for obtaining favorable connection features (characteristics), there is a lower limit for the ratio DE between the thickness Dt of the dielectric layer 13 and the thickness Et of the electrode layer 11 at the connection boundaries 18. It was also found that, as a condition for obtaining favorable connection features, there is an upper limit for the ratio ED between the thickness Et of the electrode layer 11 and the thickness Dt of the dielectric layer 13 at the connection boundaries 18. It was confirmed that the minimum value DEmin of the ratio DE exhibits correlation expressed by a linear equation with the minimum value Dt1 of the thickness of the dielectric layer 13, and the maximum value EDmax of the ratio ED exhibits correlation expressed by a linear equation with the maximum value Et1 of the thickness of the electrode layer 11.

In particular, it was found that at least within the range of Condition (2) below, the correlations obtained in the respective evaluations were extremely similar regardless of the structure of the electrode layers 11 and the configuration of the metallikon layer, and the coefficients of the linear equation expressing the correlation could be calculated as indicated below. Accordingly, by manufacturing a capacitor that satisfies the following conditions, it is possible to provide a capacitor with favorable connection characteristics. Note that it was found that within the range of Condition (2) below, where the thickness Dt of the dielectric layer 13 is covered by the specific examples described above, the thickness Et at the connection boundaries 18 of an electrode layer 11 with favorable connection characteristics has an upper limit and a lower limit. In addition, the lower limit Etmin of the thickness Et of the electrode layers 11 is believed to be constant with respect to the thickness Dt of the dielectric layer 13, and it is desirable for Condition (4) below to be satisfied. The lower limit of Condition (4) may be 0.015 μm, at which more stable connection characteristics are obtained. This relationship may be adopted as the upper limit Dtmax of the thickness Dt of the dielectric layers 13 with respect to the thickness Et of the connecting parts of the electrode layers 11. That is, the upper limit Dtmax may satisfy the following Condition (4').

$$0.1\ \mu m \leq Dt1 \leq Dt \leq 1.5\ \mu m \quad (2)$$

$$Etmin \geq 0.010\ \mu m \quad (4)$$

$$Dtmax \leq 1.5\ \mu m \quad (4')$$

When the thickness Dt of the dielectric layer 13 is thinner than 0.1 μm, it may be difficult to form the margins for manufacturing capacitors, and the laminated product itself may be hard and brittle. This makes it may be hard to stably manufacture capacitors with favorable characteristics. On the other hand, if the thickness Dt of the dielectric layer 13 is greater than 1.5 μm, it may be difficult to uniformly cure a monomer by electron beam irradiation, and it may take a long time to cure the monomer. Accordingly, when the range of Condition (2) is exceeded, it may be difficult for a polymer multi-thin-layer capacitor 1 to achieve stable quality and to be manufactured with realistic level of productivity.

For the specific examples described above, it was found that the upper limit Etmax (Et1) of the thickness Et of the electrode layer 11 at the boundary regions 18 increases relative to the thickness Dt of the dielectric layer 13 so that as the thickness Dt increases, the upper limit Etmax increases. In addition, when focusing on the values DE1 and DE2, which are the ratio of the upper limit Etmax to the minimum value (minimum set value) Dt1 of the thickness Dt, that is, the minimum value DEmin of the value DE, it was found that there is correlation expressed by a linear function to the minimum set value Dt1 of the thickness of the dielectric layer 13. Accordingly, to provide capacitors 1 with favorable connection characteristics, it is desirable to use the range in Condition (5) below. Note that DEmin is expressed by Condition (1), and since Etmin is constant, DEmax is expressed by Condition (6).

$$DEmin \leq Dt/Et \leq DEmax \quad (5)$$

$$DEmin \geq a \times Dt1 + b \quad (1)$$

$$DEmax \leq c \times Dt1 \quad (6)$$

Note that a, b and c are coefficients, and the units of coefficients a and c are $\mu m^{-1}$.

In the range of Condition (2), the coefficients of Conditions (1) and (6) can be determined as follows from the results of Specific Examples 1 to 3 described above. That is, Condition (1) may satisfy the following Condition (3a) or Condition (3b).

$$DEmin \geq 5,0Dt1 + 1.7 \quad (3a)$$

$$DEmin \geq 5.1Dt1 + 2.2 \quad (3b)$$

Condition (6) may be Condition (6a) or Condition (6b) below.

$$DEmax \leq 100Dt1 \quad (6a)$$

$$DEmax \leq 66.7Dt1 \quad (6b)$$

The ranges of coefficients a, b, and c may satisfy Condition (12) below.

$$4.9 < a < 5.2 \quad (12)$$
$$1.7 < b < 2.4$$
$$60 < c < 110$$

Accordingly, when manufacturing the main body 10 by laminating (stacking) the dielectric layers 13 and the electrode layers 11 in step 41 of the method of manufacturing 40 depicted in FIG. 3, it is desirable to set the thickness Dt of each dielectric layer 13 and the thickness Et of each electrode layer 11 at the connection boundaries 18 so that the ratio DE of these thicknesses is at least the minimum value (first value) DEmin. The first value DEmin can be derived from the minimum set value Dt1 of the thickness Dt as described earlier.

In the capacitors 1, it is desirable for the thickness Et of each electrode layer 11 at the connection boundaries 18 to satisfy, from the above conditions, the following condition (7) relative to the thickness Dt of each dielectric layer 13.

$$Et \leq Dt/DEmin \quad (7)$$

On the other hand, when focusing on the thickness Dt of the dielectric layer 13 at the connection boundaries 18, it is desirable for Condition (8) below to be satisfied with respect to the thickness Et of the electrode layer 11.

$$Dt \geq DEmin \times Et \qquad (8)$$

From the specific examples described above, it is believed that even if the electrode layers 11 contain at least one of zinc, copper, gold, silver, and an alloy containing any of these metals aside from aluminum, it will be possible to provide capacitors 1 with favorable connection characteristics under the conditions described above. Each electrode layer 11 may include a heavy edge portion 16 and a dummy edge portion 17 where the connection boundaries 18 that connects with the external electrodes 20 are thicker than the internal electrode part 15 as described above in the present embodiment, or may not include these portions. The heavy edge portion 16 and the dummy edge portion 17 may include any of aluminum, zinc, and an alloy any of these metals. In addition, the dielectric layer 13 may or may not contain thermosetting resin. The metallikon layer 21 is not limited to zinc and aluminum, and may be made of copper or an alloy, such as brass, containing zinc and aluminum.

In addition, it was found that the value ED (ED=Etmax/Dt), which is the ratio of the thickness Dt of the dielectric layer 13 to the upper limit Etmax of the thickness of the electrode layer 11, is the maximum value EDmax of the ratio ED, and by focusing on this, there is correlation expressed by a linear function with the maximum value (maximum set value) Etmax (Et1) of the thickness Et of the electrode layer 11. By focusing on this value ED, within the range of Condition (2) above, the range in which the connection features are favorable can be expressed by Condition (9) below. Note that since EDmax is expressed by Condition (10) and Etmin is constant, it is desirable for EDmin to satisfy Condition (11).

$$EDmin \leq Et/Dt \leq EDmax \qquad (9)$$

$$EDmax \leq d \times Et1 + e \qquad (10)$$

$$EDmin \geq f \times Et1 \qquad (11)$$

Note that d, e, and f are coefficients, and the units of the coefficients d and f are µm$^{-1}$.

From the results of Specific Example 1 depicted in FIGS. 7(c) and 7(d), the results of Specific Example 2 depicted in FIGS. 10(c) and 10(d), and the results of Specific Example 3 depicted in FIGS. 13(c) and 13(d), Condition (10) may be Condition (10a) or Condition (10b) below.

$$EDmax \leq -3.0Et1 + 0.6 \qquad (10a)$$

$$EDmax \leq -2.3Et1 + 0.5 \qquad (10b)$$

Condition (11) may be Condition (11a) or Condition (11b) below.

$$EDmin \geq 0.007Et1 \qquad (11a)$$

$$EDmin \geq 0.01Et1 \qquad (11b)$$

The ranges of the coefficients d, e, and f may satisfy Condition (13) below.

$$-3.0 < d < -2.2 \qquad (13)$$
$$0.4 < e < 0.6$$
$$0.006 < f < 0.02$$

Accordingly, when manufacturing the main body 10 by laminating the dielectric layers 13 and the electrode layers 11 alternatively in step 41 of the method of manufacturing 40 depicted in FIG. 3, the thickness Et of each electrode layer 11 and the thickness Dt of each dielectric layer 13 at the connection boundaries 18 may be set so that the ratio ED of the thicknesses does not exceed the maximum value EDmax.

In multilayer capacitors, such as film capacitors and polymer multi-thin-layer capacitors (thin layer film polymer multilayer capacitors), the only established method for connecting the multilayer part 7 of the main body 10 and the external electrodes 20 is metallikon (metallization), and commercialization is yet to be performed. This is because at present, methods aside from metallikon cannot ensure the mechanical strength that is required for a capacitor. Heavy edge technologies are sometimes used in film capacitors to improve the withstand voltage and to lower the connection resistance between the multi-filmed body and metallikon parts of external electrodes. In the case of conventional film capacitors, since the dielectric resin layers are thicker than 1.5 µm and the films are staggered, it is believed that connecting to metallikon parts will be simple even if the thickness of metal layers at the heavy edge part is increased. On the other hand, in a thin-layer-film polymer multilayered type capacitor 1 including thin layer dielectric layers 13, the thickness of each of the dielectric resin layers 13 will be less than 1.5 µm, and in most products will be less than 1.0 µm. In this specification, by the several specific examples, the connection features were examined and it was found that if the thickness of the metal layers at the heavy edge portions 16 (that is, the electrode layers 11 at the connection boundaries 18) is too thick, it may be hard to form connections to the metallikon layers 21 of the external electrodes 20 and/or the connection resistance is high. In addition, in an integrated multilayer body 10, such as the polymer multi-thin-layer type capacitor 1, it is not possible to stagger the layers at connection parts as in a conventional film capacitor and therefore difficult to improve connection characteristics using that type of method.

In contrast, in the present invention, as described earlier, it was found that by appropriately controlling the thickness Et of the electrode layer 11 at the connection boundaries 18 with respect to the thickness Dt of the dielectric layer 13, it is possible to provide a capacitor 1 in which the connections with the metallikon layers 21 are electrically and mechanically favorable, even in a polymer multilayer capacitor where the thickness of the dielectric layer 13 is less than 1.5 µm.

Note that although specific embodiments of the present invention have been described above, various other embodiments and modifications will be conceivable to those of skill in the art without departing from the scope and spirit of the invention. Such other embodiments and modifications are addressed by the scope of the patent claims given below, and the present invention is defined by the scope of these patent claims.

The invention claimed is:

1. A capacitor comprising a main body in which dielectric layers and electrode layers are alternatively laminated, and an external electrode connected to at least a part of the main body by metallikon,
wherein each of the dielectric layers has a thickness Dt at a connection boundary where the main body is connected to the external electrode,
each of the electrode layers has a thickness Et at the connection boundary, and
a ratio between the thickness Dt, the thickness Et, and a first value DEmin satisfy a following condition with respect to a minimum set value Dt1 of the thickness Dt $$Dt/Et \geq DE\text{min}$$
$$DE\text{min} \geq a \times Dt1 + b$$
$$0.1 \ \mu m \leq Dt1 \leq Dt \leq 1.5 \ \mu m$$
$$4.9 < a < 5.2$$
$$1.7 < b < 2.4$$

where a and b are coefficients.

2. The capacitor according to claim 1, wherein the first value DEmin satisfies the following condition $$DE\text{min} \geq 5.0Dt1 + 1.7.$$

3. The capacitor according to claim 1, wherein the first value DEmin satisfies the following condition $$DE\text{min} \geq 5.1Dt1 + 2.2.$$

4. The capacitor according to claim 1, wherein the electrode layers include at least one of aluminum, zinc, copper, gold, silver, and an alloy containing any of aluminum, zinc, copper, gold, and silver.

5. The capacitor according to claim 1, wherein each of the electrode layers includes an internal electrode part and a heavy edge portion, and the heavy edge portion includes a connecting part that connects to the external electrode and is thicker than the internal electrode part.

6. The capacitor according to claim 5, wherein the heavy edge portion includes at least one of aluminum, zinc, and an alloy of aluminum or zinc.

7. The capacitor according to claim 1, wherein each of the electrode layers includes an internal electrode part and a dummy edge portion, and the dummy edge portion includes a connecting part that connects to the external electrode and is separated from the internal electrode part.

8. The capacitor according to claim 1, wherein the dielectric layers include thermosetting resin.

9. The capacitor according to claim 1, wherein the external electrode contains at least one of aluminum, zinc, copper, and an alloy containing any of aluminum, zinc, and copper.

10. The capacitor according to claim 1, wherein each of the electrode layers has a thickness of an internal part that is thinner than 0.01 μm.

11. The capacitor according to claim 1, wherein the value Dt1 of the thickness Dt satisfies the following condition $$0.1 \ \mu m \leq Dt1 \leq Dt \leq 0.5 \ \mu m.$$

12. A method of manufacturing a capacitor including a main body in which dielectric layers and electrode layers are alternatively laminated and an external electrode connected to at least a part of the main body,
the method comprising laminating the dielectric layers and the electrode layers so that a ratio between a thickness Dt of each of the dielectric layers at a connection boundary where the main body is connected to the external electrode, a thickness Et of each of the electrode layers at the connection boundary, and a first value DEmin satisfies the following conditions with respect to a minimum set value Dt1 of the thickness Dt $$Dt/Et \geq DE\text{min}$$
$$DE\text{min} \geq a \times Dt1 + b$$
$$0.1 \ \mu m \leq Dt1 \leq Dt \leq 1.5 \ \mu m$$
$$4.9 < a < 5.2$$
$$1.7 < b < 2.4$$

where a and b are coefficients.

13. The method according to claim 12, wherein each of the electrode layers has a thickness of an internal part that is thinner than 0.01 μm.

14. The method according to claim 12, wherein the value Dt1 of the thickness Dt satisfies the following condition $$0.1 \ \mu m \leq Dt1 \leq Dt \leq 0.5 \ \mu m.$$

* * * * *